Aug. 14, 1962 W. SONNEBORN 3,049,596

CARRIER FREQUENCY COMMUNICATION SYSTEM

Filed Aug. 1, 1960

Inventor
Willi Sonneborn
BY Michael S. Striker
Attorney

3,049,596
CARRIER FREQUENCY COMMUNICATION SYSTEM

Willi Sonneborn, Bergisch-Gladbach, Germany, assignor to Felten & Guilleaume Carlswerk A.G., Koln-Mulheim, Germany Filed Aug. 1, 1960, Ser. No. 46,582
Claims priority, application Germany Aug. 3, 1959
9 Claims. (Cl. 179—175.31)

Figure 1:
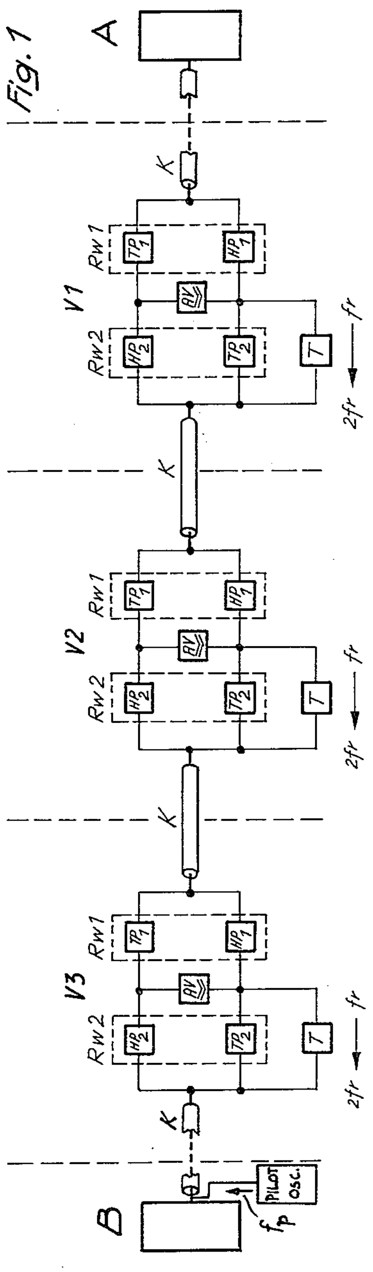

The present invention refers to a carrier frequency communication system with two terminal stations and a plurality of usually unattended intermediate two-way repeater stations, operating according to the two-way two-band method which means operation with two-separate carrier frequency bands spaced from each other. The range of frequencies located between the two carrier frequency bands used for communication will be called hereinafter the intermediate frequency range.

More particularly the invention concerns a system for testing the operativeness of the individual intermediate repeater stations.

If in carrier frequency communciation systems unattended repeater stations are provided, then it is necessary to check or test their operativeness or electrical behavior by procedures established or carried out in an attended station, usually one or the other of the terminal stations of the system. The purpose of such remote checking is to locate geographically that repeater station which is either defective or unoperative or which displays changes of certain electrical characteristics which would indicate aging whereby either the performance or the quality of the transmission is degraded or is likely to cause such degradation in the near future. It is therefore desired not only to locate in-operative repeater stations for the purpose of repair or exchange, but also to determine from time to time which repeater appears to be aging prematurely and therefore should be exchanged or repaired as a matter of precaution.

Several methods of carrying out checks of the above mentioned nature are known. One of these methods is called "loop-gain method." According to this method the amplification of signals carried out by the individual repeater stations is measured by transmitting from one terminal station a test freqency within the lower communication carrier frequency band for every repeater station, this test frequency being transformed by the respective repeater station through certain auxiliary equipment into the upper carrier frequency band so that the test signal is returned within the upper carrier frequency band through the regular communication means to the terminal station which has transmitted the test frequency. The disadvantage of this method consists in the fact that repeater stations which are aging prematurely cannot be recognized and that in the case of inoperativeness of one particular repeater station those other repeater stations located on the remote side of the defective repeater station cannot be reached anymore by the respective test frequency whereby a testing of those other repeater stations is made impossible.

In other known methods modulation products are used for testing the repeater stations. However, this method requires additional components in the repeater stations which are highly undesirable in view of the desire of providing for a long service life expectancy for the repeater stations, also such additional components require additional space, or in the terminal stations auxiliary equipment would have to be provided which is generally alien to the carrier communication system, as for instance impulse generators or the like.

Moreover certain methods are known which supplement the above mentioned "loop-gain method" for measuring the aging of the repeater stations by utilizing the non-linearity thereof for forming modulation products which in some way cooperate with the test frequency or a multiple thereof. However, these known methods entail the disadvantage that during the testing of the particular repeater station the same frequency product is also produced to a greater or lesser degree by the other existing repeater stations, i.e., all or at least a plurality of the existing repeater stations of a system are somehow participating in the expected modulation product so that the indications or observations obtained by such a test are not unequivocal.

It is therefore a main object of this invention to provide for a system for the purpose set forth above, encompassing the advantages of the above mentioned known methods while avoiding their disadvantages.

It is another object of this invention to provide for a test system for repeater stations which is entirely reliable and requires a minimum of components of comparatively simple structure in each repeater station.

With above objects in view the invention provides in a carrier frequency communication system with two terminal stations and at least two intermediate two-repeater stations operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions between said portions, one-way amplifier means having input and output terminals, respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency of said multiplier means to at least one of said first and second direction control means, said frequency-mutliplier means being capable of selectively multiplying only a discrete test frequency preassigned to and distinctive of the particular repeater station and located within the intermediate frequency range between said higher and lower carrier frequency bands and of delivering an output frequency higher than the lowest one of said higher frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be multiplied by the frequency-multiplier means of that specific repeater station and returned to said one terminal station through said transmission means provided that said specific repeater station is operating properly.

In a preferred embodiment of the invention, in each repeater station only one single one-way amplifier is provided which is so connected between said first and second frequency-selective direction control means that both the higher carrier frequency band and the lower carrier frequency band are directed through the one amplifier and the respective high frequency and low frequency signals are amplified thereby. If now two selected different frequencies $f_1$ and $f_2$ are transmitted from one of the two terminal stations at suitable volume and within the frequency band associated with that particular station, then, in view of the non-linearity of the above mentioned amplifier in a repeater station a modulation product $f_r=nf_1 \pm mf_2$ is produced by superposition of the above mentioned frequencies at the output terminal of the amplifier and this modulation product constituting the test frequency is located in the intermediate frequency range and is determined by the selection of the first mentioned frequency $f_1$ and $f_2$ to be the test frequency distinctive of and preassigned to one particular of one of the repeater stations in the system. For obvious reasons the factors $n$ and $m$ are small integer numbers.

In a preferred embodiment of the invention and for practical purposes the frequency multiplier means are frequency doublers. Consequently, the above mentioned output frequency $f_r$ of each particular amplifier is doubled and this doubled test frequency is applied to that end of the selective direction control means where the higher frequency band is received so that this doubled test frequency can now be transmitted through the transmission means back to the one terminal station from which the frequencies $f_1$ and $f_2$ have been transmitted because this doubled test frequency is located within or slightly above the above-mentioned higher carrier frequency band. The above statement applies particularly if the just-mentioned frequencies have been transmitted from that one terminal station which usually transmits signals within the lower carrier frequency band. However, additionally a second modulation product is obtained at the tested repeater station from mixing the above-mentioned doubled test frequency with another frequency e.g. the usually available pilot frequency. This is applicable when the primary frequencies $f_1$ and $f_2$ are transmitted from the other terminal station within the higher carrier frequency band because in this case the doubled test frequency mixed with e.g. the pilot frequency produces a modulation product which is located within the lower frequency band so that this second modulation product can be received by the just-mentioned other terminal station which usually operates over the lower frequency band. As is well known, the pilot frequency is a frequency signal which is continuously transmitted from one of the terminal stations and which usually is located close to the upper boundary of the higher carrier frequency band.

From the above it can be seen that the system according to the invention makes it possible to check and test each repeater station of a system individually and to obtain information about the operativeness or the electrical performance thereof, and in addition to locate those repeater stations which are not in operative condition. This is done by transmitting selected freqencies from either one of the two terminal stations for the purpose of forming modulation products which are located within the intermediate frequency range and by transposing such modulation products into other frequencies, either directly or by forming a second modulation product with the aid of other frequencies, with the result that in any case a signal representative of the performance or operativeness (or non-operativeness) of any one individual repeater station is returned to that terminal station from which the testing procedure has been initiated.

It is to be noted that furthermore, when the signal transmission through carrier frequency transmission is stopped, also noise components e.g., tube noise within the range of the individual respective test frequency can be doubled or multiplied by the frequency multiplier means in the individual repeater stations and will be thereafter amplified by the respective amplifier means and returned within the higher carrier frequency band to the particular terminal station. In this manner the system according to the invention can be utilized also for checking the individual repeater stations regarding the noise production thereof caused by intermodulation.

Figure 2:
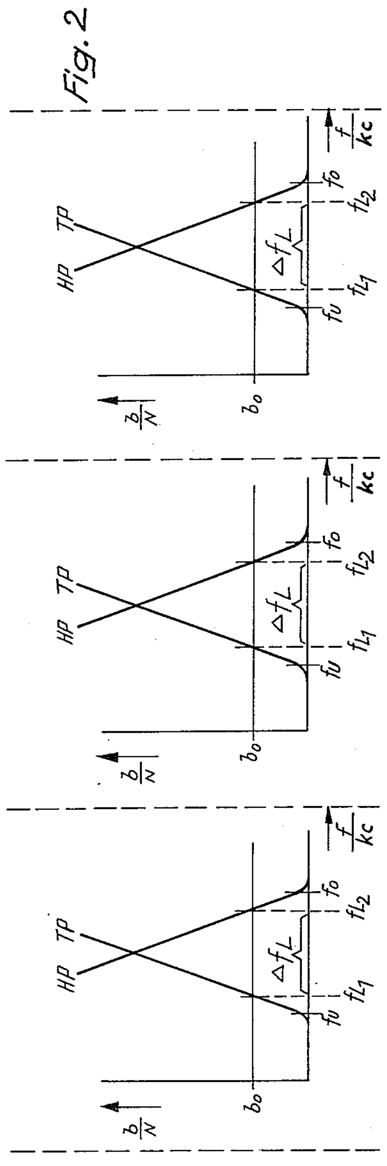

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing in which:

FIG. 1 is a schematic circuit diagram illustrating a carrier frequency communication system incorporating the invention in the form of one preferred embodiment thereof, only those components of the system being shown which are necessary for understanding the invention; and FIG. 2 is a graph illustrating for the frequency-selective direction control means of every one of the three repeater stations illustrated by FIG. 1, the attenuation versus frequency characteristics thereof. The broken lines separating the individual graphs are intended to indicate the relation between the individual graph and the respectively associated repeater station shown in FIG. 1.

Referring now to FIG. 1, the illustrated carrier frequency communication system comprises two terminal stations A and B and three intermediate two-repeater staions V1, V2 and V3, connected in tandem arrangement between the terminal stations by the transmission means e.g. a cable K having certain portions extending between the terminal stations and the individual repeater stations, respectively. Of course, the system may comprise many more repeater stations.

Each repeater station comprises, in this embodiment, a single one-way amplifier AV and frequency-selective direction control means. The latter comprise a pair of high pass filters $HP_1$, $HP_2$ and a pair of low pass filters $TP_1$ and $TP_2$, connected between the adjoining portions of the cable K and the amplifier AV, and with the latter, in the manner shown in FIG. 1 so that messages transmitted from the terminal station A within the lower frequency band as well as messages transmitted from the other terminal station B toward the other station within the higher frequency band are directed through the amplifier AV. In each repeater station the output terminal of the amplifier AV is connected to the input of a frequency multiplier, or more particularly a frequency doubler T. The output terminal thereof is connected with that end of the particular repeater station, or more specifically with that end of the respective direction control means which are arranged to receive the higher frequency band transmitted from the station B.

As has been stated above, upon transmission of two selected auixliary frequencies within the respective carrier frequency band from either one of the terminal stations AB, a modulation product serving as the characteristic test frequency $f_r$ for a repeater station will be formed at the output terminal of the respective amplifier AV and will be re-applied as a doubled test frequency $2f_r$ to the transmission means. It is essential that each of the frequency multiplier or frequency doubler devices T of generally known type is frequency-selective in itself so that in each particular repeater station the respective device T will multiply or double only one particular test frequency specifically preassigned to that particular repeater station and therefore distinctive thereof. This can be achieved in generally known manner by means of resonance circuits or similar means within the frequency multiplier or frequency doubler T.

The graphs of FIG. 2 illustrate the attenuation characteristics of one high pass filter HP and one low pass filter TP of the corresponding repeater station, the attenuation curve being marked accordingly. In each graph the abscissa represents the frequencies $f$ in kilocycles and the ordinate indicates the attenuation $b$ in Nepers. The marking $f_u$ represents the upper boundary of the lower carrier frequency band, and the marking $f_o$ indicates the lower boundary of the upper carrier frequency band.

Consequently, the difference $\Delta f=f_o-f_u$ would be the above mentioned intermediate frequency range. As would be understood from the above, the lower carrier frequency band having the upper limit frequency $f_u$ is transmitted in the direction from station A to B, while in the direction from the station B to the station A the upper carrier frequency band with a lower limit frequency $f_o$ is transmitted.

The existence of this intermediate frequency range can be used according to the invention to great advantage for the purpose to prevent the modulation product or test frequency $f_r$ appearing at the output of each of the amplifiers of the various repeater stations from being applied through the transmission means to the other repeater stations and particularly to the respective amplifiers thereof whereby modulation products intended to be formed there would be affected.

For achieving this advantage the arrangement must be such that the modulation products or test frequencies $f_r$ are so located within the intermediate frequency range that they are sufficiently attenuated both by the low pass filters and by the high pass filters. Such minimum attenuation is indicated in FIG. 2 by the level lines $b_o$ and should be for practical purposes at least 3 Neper. As can be seen also from FIG. 2 the attenuation curves HP and TP intersect the horizontal lines $b_o$. The curve TP has an intersection point corresponding to a frequency $f_{L1}$. Frequencies above $f_{L1}$ are subjected to a greater attenuation than $b_o$ as is indicated by the shape of the curve TP. In the case of the high pass filter the required minimum attenuation $b_o$ corresponds to a frequency $f_{L2}$ and the attenuation would increase for frequencies lower than $f_{L2}$. Therefore, if the modulation product or test frequency $f_r$ is located within the reduced frequency range $\Delta f_L$ indicated between $f_{L1}$ and $f_{L2}$ then one can be sure that a test frequency $f_r$ located within the just mentioned smaller intermediate frequency range will be attenuated both by the low pass filter and by the high pass filter to a degree at least equal to the indicated minimum attenuation $b_o$. However, between the output terminal of each amplifier AV and the input terminal of the next following amplifier AV the test frequency $f_r$ located within the frequency range $\Delta f_L$ will be subjected to a total attenuation $b\geqq 2b_o$ because the frequency $f_r$ has to pass through two low pass filters or two high pass filters, as the case may be. Any additional attenuation caused by the interposed cable portions can be disregarded because this attenuation is compensated by the amplifiers. By suitably choosing the magnitude of the required minimum attenuation $b_o$ resulting in corresponding narrowing or widening of the intermediate frequency range $\Delta f_L$ it can be arranged that the modulation product or test frequency $f_r$ is sufficiently attenuated to be prevented from reaching any one of the subsequent repeater amplifiers. Consequently, at the output terminal of the individual amplifiers AV only that one modulation product or test frequency $f_r$ will be present which is formed in that particular repeater station.

The individual different test frequencies $f_r$ preassigned to and distinctive of the respective repeater stations are selected in such a manner that they are located within the intermediate frequency range $\Delta f_L$. Basically, the above mentioned two selected auxiliary frequencies $f_1$ and $f_2$ may be transmitted either from the station A or from the station B, or one of them may be transmitted from the station A and the other one from the station B in each case the auxiliary frequency must be located within the carrier frequency band assigned to the particular terminal station. Ordinarily it is desirable that the doubled or multiplied modulation product or test frequency $f_r$ is located close to the upper boundary of the higher carrier frequency band so that it can be transmitted from the respective repeater station back to the terminal station A. However, a modification of this system will be described further below.

Assuming, for example, that from the terminal station A two auxiliary frequencies $f_1$ and $f_2$ at a suitable predetermined amplitude are transmitted toward the station B by means of the lower carrier frequency band, and assuming further that the just mentioned two auxiliary frequencies are so selected that a strong modulation product or test frequency $f_r=nf_1+mf_2$ is formed which is located in the reduced intermediate frequency range $\Delta f_L$ and is identical with a preassigned test frequency of a particular repeater station, then the frequency doubler T of a particular repeater station and selectively capable of doubling only that particular test frequency will produce an output frequency $2(nf_1\pm mf_2)$. By properly selecting the auxiliary frequencies $f_1$ and $f_2$ the doubled test frequency will be located within or slightly above the higher carrier frequency band and can therefore be transmitted through the high pass filter $HP_2$, the associated amplifier AV (with amplification thereby), the associated high pass filter $HP_1$ and through the transmission means, possibly including other repeater stations, back to the terminal station A. By measuring the amplitude of that doubled test frequency upon arrival at the terminal station A the electrical condition or performance of the amplifier AV of the particular tested repeater station can be judged.

In a similar manner it is possible according to the invention to locate any repeater station which has become inoperative. For instance the inoperativeness of the repeater station $V_2$ can be determined by the application of the above described procedure as follows: If in the manner described above different combinations of auxiliary frequencies $f_1$ and $f_2$ are sequentially transmitted by means of the lower carrier frequency band from the terminal station A, then, if all repeater stations are in good operation condition, the doubled modulation products or test frequencies respectively produced in all of the repeater stations would be received in the terminal station A through the higher carrier frequency band. However, e.g. if the repeater station $V_2$ has become inoperative, then only the doubled test frequency characteristic of the repeater station $V_1$ will be returned from that repeater station, but no doubled test frequency will be returned from the repeater station $V_2$ and also not from any one of the repeater stations beyond the station $V_2$ as seen from the station A. Thus in the station A it is determined that the repeater station $V_2$ is inoperative, but it is still possible that also one of the other repeater stations beyond the station $V_2$ is defective. In order to determine whether this is so, two other auxiliary frequencies $f_1$ and $f_2$ located within the higher carrier frequency band are transmitted from the terminal station B. It is possible to obtain from these auxiliary frequencies a doubled test frequency located in the higher carrier frequency band, but such doubled test frequency could be received in the terminal station A only if the repeater station $V_2$ were not inoperative and if all other repeater stations were in good condition. In any case, the path from the station B to the station A is now blocked by the defective repeater station $V_2$. In order to be able to receive in the terminal station B an indication about the condition of the repeater station between the terminal station B and the defective repeater station $V_2$, a third auxiliary frequency located in the upper carrier frequency band is required. Such third auxiliary frequency could be transmitted from the terminal station B, but for the sake of convenience the usually available pilot frequency is preferably used for this purpose. The pilot frequency has been defined further above in the specification. The third auxiliary frequency is to be chosen, and the pilot frequency is in any case suitable, to form with the doubled modulation product or test frequency located, as stated above, within the upper carrier frequency band, a further modulation product which however will be located within the lower carrier frequency band and therefore this further modulation product being indicative and characteristic of a particular repeater station located between the station B and the repeater station $V_2$ will be transmitted back and can be received by the terminal station B. Thus the arrival or non-arrival of the last mentioned modulation product at the station B will indicate whether a repeater station between terminal station B and the repeater station $V_2$ is operative or defective, respectively.

From the above it can be seen that it is possible according to the invention to transmit properly selected auxiliary frequencies $f_1$ and $f_2$ from the terminal station A as well as from the terminal station B, or one of these frequencies from the station A and the other one from the station B, in each case of course within the carrier frequency band assigned for the transmission from the particular terminal station. The only condition is that as a rule the doubled modulation product or test frequency can be received in the terminal station A by transmission within the higher carrier frequency band. However, if a modulation product is to be received also in the terminal station B then a third auxiliary frequency transmitted either from the station A or from the station B is mixed with the above mentioned doubled modulation product or test frequency located in the higher carrier frequency band so as to form a further modulation product which is then located within the lower carrier frequency range and can therefore be returned to and received by the terminal station B.

In order to increase the sensitivity of the above procedure it is advisable to measure by well known means the volume of the modulation products received at the terminal stations at a volume which is close to the volume range limit of the amplifiers AV because in this area the volume of the modulation products increases steeply and aging of the amplifier components would produce relatively great changes.

NUMERICAL EXAMPLE

May it be assumed that the communication system comprises the repeater stations $V_1$, $V_2$ and $V_3$. The system may be operating with 60 channels and the lower carrier frequency band may comprise frequencies between 24 and 264 kilocycles, and the higher carrier frequency band may comprise frequencies between 312 and 552 kilocycles. The pilot frequency $f_p$ may be 553 kilocycles. The attenuation $b_0$ may have been chosen to amount to 4 Neper determining for the low pass filters a frequency $f_{L1}$ of 283 kilocycles and for the high pass filters a frequency $f_{L2}$ of 290 kilocycles. Consequently the reduced intermediate frequency range $\Delta f_L$ amounts to 290−283=7 kilocycles. If the spacing between the individual test frequencies is chosen to be 0.1 kilocycle then it would be possible to test 71 intermediate repeater stations within the range of 7 kilocycles. However, in the present example only the test frequencies for 3 intermediate repeater stations are to be determined. Therefore these 3 test frequencies are assigned to the 3 repeater stations as follows:

$V_1$ has the test frequency $f_{r1}$:288.0 kilocycles
$V_2$ has the test frequency $f_{r2}$:288.1 kilocycles
$V_3$ has the test frequency $f_{r3}$:288.2 kilocycles

A. *Checking on Amplification and Aging*

From the terminal station A the following auxiliary frequencies $f_1$ and $f_2$ are transmitted and the corresponding doubled modulation products or test frequencies $2f_r$ are formed and received:

| | $f_1$, kc. | $f_2$, kc. | $(f_1+f_2)=f_r$, kc. | $2(f_1+f_2)=2f_r$, kc. | Remarks |
|---|---|---|---|---|---|
| Repeater: | | | | | |
| $V_1$ | 135 | 153 | 288 | 576 | Received. |
| $V_2$ | 135 | 153.1 | 288.1 | 576.2 | Do. |
| $V_3$ | 135 | 153.2 | 288.2 | 576.4 | Do. |

B. *Testing of Repeater Stations, Finding That $V_2$ Is Inoperative*

The following auxiliary frequencies $f_1$ and $f_2$ are transmitted from the terminal station A for testing first the repeater station $V_1$ and then the station $V_2$, with the result that the corresponding doubled modulation products or test frequencies $2f_r$ are received back or not received:

| | $f_1$, kc. | $f_2$, kc. | $(f_1+f_2)=f_r$, kc. | $2(f_1+f_2)=2f_r$, kc. | Remarks |
|---|---|---|---|---|---|
| Repeater: | | | | | |
| $V_1$ | 135 | 153 | 288 | 576 | Received. |
| $V_2$ | 135 | 153.1 | 288.1 | 576.2 | Not received. |

Now, since $V_2$ has been found inoperative, the following auxiliary frequencies $f_1$ and $f_2$ are transmitted from the terminal station B for testing the repeater stations $V_2$ and $V_3$, with the results marked below:

| | $f_1$, kc. | $f_2$, kc. | $2f_2-f_1=f_r$, kc. | $2(2f_2-f_1)=2f_r$, kc. | $2f_r-f_p$, kc. | Remarks |
|---|---|---|---|---|---|---|
| Repeater: | | | | | | |
| $V_3$ | 500 | 394.1 | 288.2 | 576.4 | 23.4 | Received. |
| $V_2$ | 500 | 394.05 | 288.1 | 576.2 | 23.2 | Not received. |

It will be understood that in the just charted example the characteristic of the amplifiers is such that in the previously used equation the factor $n$ is 2 and the factor $m$ is 1. Moreover, the doubled test frequency $2f_r$ is mixed with the pilot frequency $f_p$ for obtaining a further modulation product as indicated in the last figure column of the above chart. As can be seen the result of the last described test is that the repeater station $V_3$ is in operative condition while the non-operativeness of the station $V_2$ is confirmed.

If it is desired to check also in accordance with the invention on the noise conditions of the individual amplifiers or repeater stations, then, for obtaining as high a noise level as possible, the frequency-selective elements of the arrangement are suitably constructed or chosen in such a manner that these frequency-selective elements transmit a frequency band of a certain width $$B=\frac{f_{L2}-f_{L1}}{A}$$

wherein A is the number of repeater stations in the whole transmission system. This means that the available band width of the intermediate frequency range $f_{L2}-f_{L1}$ is completely and evenly distributed among the repeater stations of the whole transmission system. The frequencies within this band width are then doubled by the frequency doubler means and are returned, exactly as the above mentioned doubled test frequencies, via the high pass filters $HP_2$, the respective amplifiers AV (with amplification thereby) and via the respective high pass filters $HP_1$ by means of the higher carrier frequency band to the terminal station A where any deterioration of the noise conditions of the particular repeater station associated with the particular received frequency band can be judged from the possibly appearing increase of the received noise level.

It is of importance for the operation of the system according to the invention that the two carrier frequency bands and the intermediate frequency range therebetween are so chosen that the frequencies amounting to twice the value of all of the frequencies located within the range $f_{L2}-f_{L1}$ are located above the upper boundary of the higher carrier frequency band and close to that boundary, in fact, if possible directly adjoining said upper boundary of the higher carrier frequency band because in this case the total frequency band width can be kept within economical limits.

It is always possible to arrange matters in such a manner that the amplitude or level of the modulation products received in the terminal stations is sufficiently high for furnishing an unequivocal indication of the performance or operativeness of the respectively tested repeater station, and this can be achieved by transmitting the above-mentioned auxiliary frequencies with a sufficiently high amplitude. However, the level of the noise frequencies will under normal conditions and operation of the repeater stations be located substantially below the obtainable amplitude of the modulation products. In order to improve the conditions for receiving the noise level and for increasing the sensitivity of modulation measurements it is highly advisable to provide the frequency multipliers in the various repeater stations according to the invention not only with frequency-selective means as mentioned above but also with a transistor amplifier, the voltages and currents required for its operation being available by deriving them from the supply current.

It will be understood that each of the elements described above, or two or more together, may also find a useful application in other types of carrier frequency communication system differing from the types described above.

While the invention has been illustrated and described as embodied in a carrier frequency communication system with two terminal stations and at least two intermediate two-way repeater stations, operating with two separate carrier frequency bands spaced from each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, one-way amplifier means having input and output terminals respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency of said frequency-multiplier means to at least one of said first and second direction control means, said frequency-multiplier means being capable of selectively multiplying only a discrete test frequency preassigned to and distinctive of the particular repeater station and located within the intermediate frequency range between said higher and lower carrier frequency bands and of delivering an output frequency higher than the lowest frequency of said higher carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be multiplied by the frequency-multiplier means of that specific repeater station and returned to said one terminal station through said transmission means provided that said specific repeater station is operating properly.

2. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, one-way amplifier means having input and output terminals, respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency band of said frequency-multiplier means to at least one of said first and second direction control means, said frequency-multiplier means being capable of selectively multiplying only a discrete test frequency band preassigned to and distinctive of the particular repeater station and located within the intermediate frequency range between said higher and lower carrier frequency bands and of delivering an output frequency higher than the lowest frequency of said higher carrier band, whereby two selected auxiliary frequencies transmitted for testing any specific one of said repeater stations from one of said terminal stations toward the other terminal station will form through superposition a test frequency band which is distinctive of said specific one of said repeater stations and located within said intermediate frequency range and therefore will be multiplied by the frequency-multiplier means of that specific repeater station and returned to said one terminal station through said transmission means provided that said specific repeater station is operating properly.

3. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, single one-way amplifier means having input and output terminals, respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency of said frequency-multiplier means to at least one of said first and second direction control means, said frequency-multiplier means being capable of selectively multiplying only a discrete test frequency preassigned to and distinctive of the particular repeater station and located within the intermediate frequency range between said higher and lower carrier frequency bands and of delivering an output frequency higher than the lowest frequency of said higher carrier frequency band, whereby two selected auxiliary frequencies transmitted for testing any spceific one of said repeater stations from one of said terminal stations toward the other terminal station will form through superposition a test frequency which is distinctive of said specific one of said repeater stations and located within said intermediate frequency range and therefore will be multiplied by the frequency-multiplier means of that specific repeater station and returned to said one terminal station through said transmission means provided that said specific repeater station is operating properly.

4. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, one-way amplifier means having input and output terminals, respectively, and being associated with said direction control means for amplifying said higher and lower frequency bands, respectively, and frequency-selective frequency doubling means connected between said output terminal and a junction point between an adjoining portion of said transmission means and that input end of said selective direction control means where said higher carrier frequency band is received, for applying the output frequency of said frequency-doubling means to at least one of said first and second direction control means, said frequency-doubling means being capable of selectively doubling only a discrete test frequency preassigned to and distinctive of the particular repeater station and located within the intermediate frequency band between said higher and lower carrier frequency bands and of delivering an output frequency preassigned to and distinctive of the particular repeater station and located within the intermediate frequency range between said higher and lower carrier frequency bands and of delivering an output frequency higher than the lowest frequency of said higher carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be doubled by the frequency-doubling means of that specific repeater station and returned to said one terminal station through said transmission means provided that said specific repeater station is operating properly.

5. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, single one-way amplifier means having input and output terminals, respectively, and being associated with said direction control means for amplifying said higher and lower frequency bands, respectively, and frequency-selective frequency-doubling means connected between said output terminal and a junction point between an adjoining portion of said transmission means and that input end of said selective direction control means where said higher carrier frequency band is received, for applying the output frequency of said frequency-doubling means to as least one of said first and second direction control means, said frequency-doubling means being capable of selectively doubling only a discrete test frequency preassigned to and distinctive of the particular repeater station and located within the intermediate frequency range between said higher and lower carrier frequency bands and of delivering an output frequency higher than the lowest frequency of said higher carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be doubled by the frequency-doubling means of that specific repeater station and returned to said one terminal station through said transmission means provided that said specific repeater station is operating properly.

6. In a carrier frequency communication system with two terminal stations and at least two intermediate two-way repeater stations, operating with two separate carrier frequency bands spaced from each oher, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, one-way amplifier means having input and output terminals, respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency of said frequency-multiplier means to at least one of said first and second direction control means, said frequency-multiplier means being capable of selectively multiplying only a discrete test frequency preassigned to and distinctive of the particular repeater station and located within the intermediate frequency range between said higher and lower carrier frequency bands and of delivering an output frequency higher than the lowest frequency of said higher carrier frequency band; and means for introducing into said transmission means a supplementary frequency higher than the lowest frequency of said higher carrier frequency band, for mixing said supplementary frequency with said output frequency end for producing a modulation product having a frequency located within said lower carrier frequency band, whereby two selected auxiliary frequencies transmitted for testing any specific one of said repeater stations from one of said terminal stations toward the other terminal station will form through super-position a test frequency which is distinctive of said specific one of said repeater station will form through superposition a test frequency range and therefore will be multiplied by the frequency-multiplier means of that specific repeater station and mixed with said supplementary frequency, and said modulation product will be returned to said one terminal station through said transmission means provided that said specific repeater station is operating properly.

7. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, single one-way amplifier means having input and output terminals, respectively, and being associated with said direction control means for amplifying said higher and lower frequency bands, respectively, and frequency-selective frequency-multiplier means connected between said output terminal and a junction point between an adjoining portion of said transmission means and that input end of said selective direction control means where said higher carrier frequency band is received, for applying the output frequency of said frequency-multiplier means to at least one of said first and second direction control means, said frequency-multiplier means being capable of selectively multiplying only a discrete test frequency preassigned to and distinctive of the particular repeater station and located within the intermediate frequency range between said higher and lower carrier frequency bands and of delivering an output frequency higher than the lowest frequency of said higher carrier frequency band; and means for introducing into said transmission means a supplementary frequency higher than the lowest frequency of said higher carrier frequency band, for mixing said supplementary frequency with said output frequency end for producing a modulation product having a frequency located within said lower carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be multiplied by the frequency-multiplier means of that specific repeater station and mixed with said supplementary frequency, and said modulation product will be returned to said one terminal station through said transmission means provided that said specific repeater station is operating properly.

8. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, one-way amplifier means having input and output terminals, respectively, and being associated with said direction control means for amplifying said higher and lower frequency bands, respectively, and frequency-selective frequency-doubling means connected between said output terminal and a junction point between an adjoining portion of said transmission means and that input end of said selective direction control means where said higher carrier frequency band is received, for applying the output frequency of said frequency-doubling means to at least one of said first and second direction control means, said frequency-doubling means being capable of selectively doubling only a discrete test frequency preassigned to and distinctive of the particular repeater station and located within the intermediate frequency range between said higher and lower carrier frequency bands and of delivering an output frequency higher than the lowest frequency of said higher carrier frequency band; and means for introducing into said transmission means a supplementary frequency higher than the lowest frequency of said higher carrier frequency band, for mixing said supplementary frequency with said output frequency end for producing a modulation product having a frequency located within said lower carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be doubled by the frequency-doubling means of that specific repeater station and mixed with said supplementary frequency, and said modulation product will be returned to said one terminal station through said transmission means provided that said specific repeater station is operating properly.

9. In a carrier frequency communication system with two terminal stations and at least two intermediate two-way repeater stations, operating with two separate carrier frequency bands spaced from each other, in combination, two-conductor transmission means connecting in tandem arrangement said terminal and repeater stations for transmitting messages between said terminal stations by means of a higher carrier frequency band in one direction and of a lower carrier frequency band in the opposite direction; each repeater station comprising first and second frequency-selective direction control means connected between respectively adjoining portions of said transmission means for selectively passing said higher and lower frequency bands, respectively, in said respective directions, single one-way amplifier means having input and output terminals, respectively, and being associated with said direction control means for amplifying said higher and lower frequency bands, respectively, and frequency-selective frequency-doubling means connected between said output terminal and a junction point between an adjoining portion of said transmission means and that input end of said selective direction control means where said higher carrier frequency band is received, for applying the output frequency of said frequency-doubling means to at least one of said first and second direction control means, said frequency-doubling means being capable of selectively doubling only a discrete test frequency preassigned to and distinctive of the particular repeater station and located within the intermediate frequency range between said higher and lower carrier frequency bands and of delivering an output frequency higher than the lowest frequency of said higher carrier frequency band; and means for introducing into said transmission means a supplementary frequency higher than the lowest frequency of said higher carrier frequency band, for mixing said supplementary frequency with said output frequency end for producing a modulation product having a frequency located within said lower carrier frequency band, whereby two selected auxiliary frequencies transmitted for testing any specific one of said repeater stations from one of said terminal stations toward the other terminal station will form through superposition a test frequency which is distinctive of said specific one of said repeater stations and located within said intermediate frequency range and therefore will be doubled by the frequency-doubling means of that specific repeater station and mixed with said supplementary frequency, and said modulation product will be returned to said one terminal station through said transmission means provided that said specific repeater station is operating properly.

References Cited in the file of this patent

UNITED STATES PATENTS 2,823,270 Cameron ---------------- Feb. 11, 1958